United States Patent
Dan

(10) Patent No.: US 7,336,405 B2
(45) Date of Patent: Feb. 26, 2008

(54) THERMAL FIXING DEVICE FOR CONTROLLING THE TEMPERATURE OF A HEAT MEMBER TO MELT TONER ON A RECORDING SHEET

(75) Inventor: Kenichi Dan, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 687 days.

(21) Appl. No.: 10/199,101

(22) Filed: Jul. 22, 2002

(65) Prior Publication Data
US 2003/0020968 A1 Jan. 30, 2003

(30) Foreign Application Priority Data
Jul. 24, 2001 (JP) ............................ P2001-223088

(51) Int. Cl.
*H04N 1/46* (2006.01)
(52) U.S. Cl. ................. 358/503; 358/1.13; 399/70; 399/69; 399/33; 399/44; 399/45; 399/94; 399/328; 399/335; 399/320; 399/96; 219/216
(58) Field of Classification Search ............... 358/1.13, 358/503; 399/69, 70, 33, 44, 45, 94, 96, 399/320, 335, 328; 219/216
See application file for complete search history.

(56) References Cited
U.S. PATENT DOCUMENTS

| | | | | |
|---|---|---|---|---|
| 4,634,262 A | * | 1/1987 | Imaizumi et al. | 399/45 |
| 5,512,992 A | * | 4/1996 | Kim et al. | 399/69 |
| 5,809,367 A | * | 9/1998 | Yoo et al. | 399/45 |
| 5,832,332 A | * | 11/1998 | Sugiura | 399/44 |
| 5,875,373 A | * | 2/1999 | Sato et al. | 399/68 |
| 5,987,275 A | * | 11/1999 | Toyohara et al. | 399/70 |
| 6,175,699 B1 | * | 1/2001 | Kato et al. | 399/69 |

FOREIGN PATENT DOCUMENTS

| JP | A 2-211472 | * | 8/1990 |
| JP | A 3-163483 | * | 7/1991 |
| JP | 5127565 | * | 5/1993 |
| JP | 05127565 A | * | 5/1993 |
| JP | A 5-127565 | * | 5/1993 |

* cited by examiner

*Primary Examiner*—Twyler Lamb
*Assistant Examiner*—Pawandeep S Dhingra
(74) *Attorney, Agent, or Firm*—Oliff & Berridge, PLC

(57) ABSTRACT

A thermal fixing device for fixing toner images onto recording sheets includes a heat member, a pressing member, a temperature sensor, a clock, and a control unit. The control unit performs a toner fixing control and a high-temperature heat-up control. During the toner fixing control, the control unit controls the heat member to heat up to a fixing temperature required to melt toner on a recording sheet disposed between the heat member and the pressing member. During the high-temperature heat-up control, the control unit controls the heat member to heat up to a high-temperature fixing temperature that is higher than the fixing temperature. The control unit sets length of the high-temperature heat-up control in accordance with length of the start-up time measured by the clock.

21 Claims, 6 Drawing Sheets

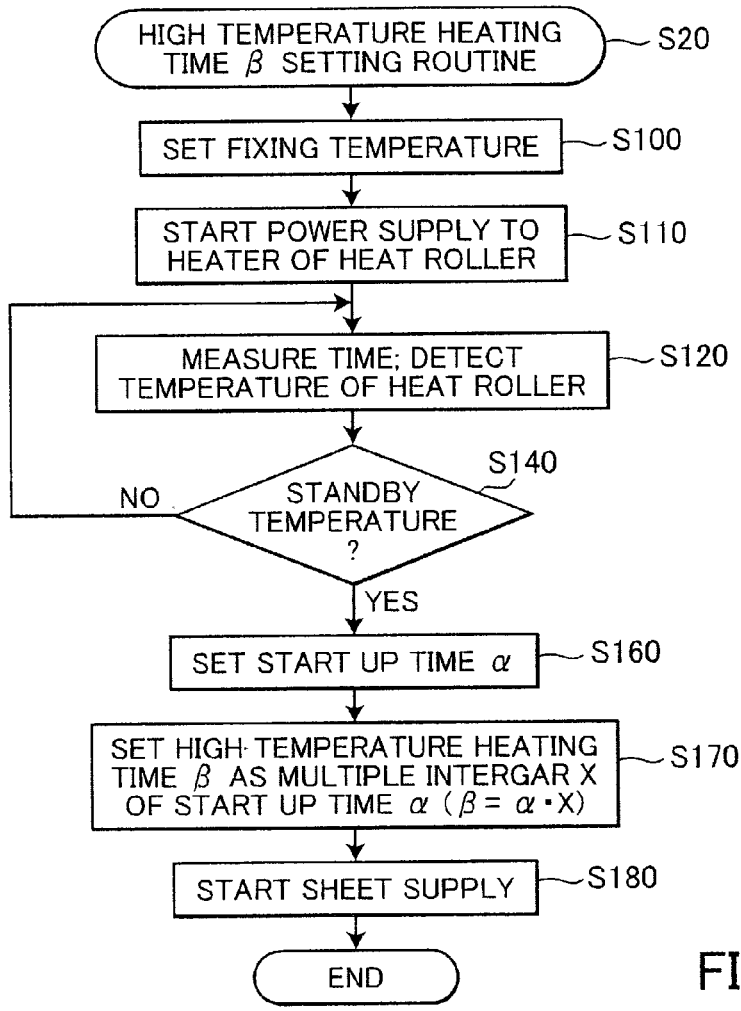
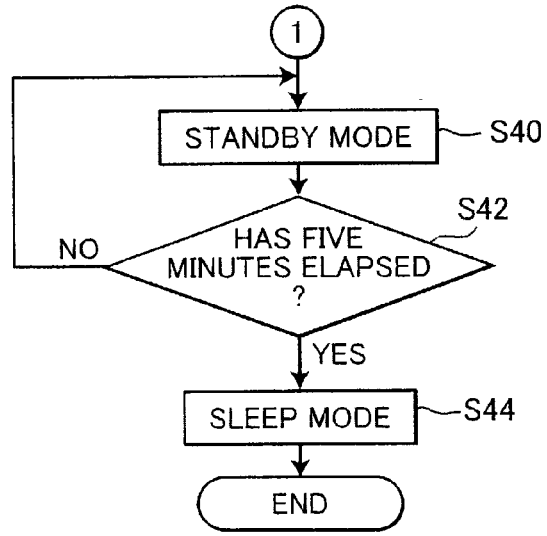

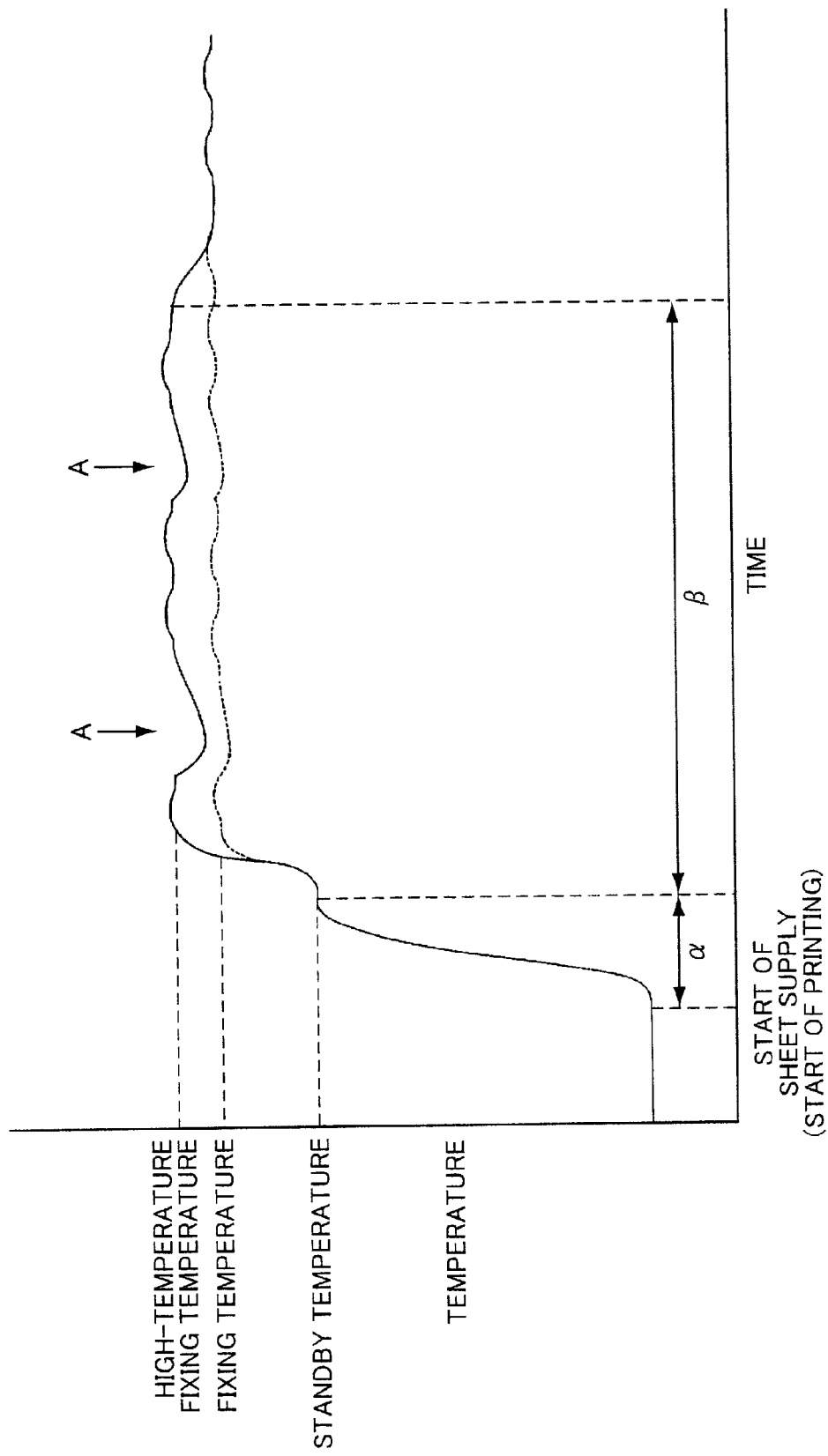

THERMAL FIXING DEVICE FOR CONTROLLING THE TEMPERATURE OF A HEAT MEMBER TO MELT TONER ON A RECORDING SHEET

BACKGROUND OF THE INVENTION

1. Field of the Invention

The present invention relates to a thermal fixing device that fixes toner onto recording sheets and to an image forming device provided with the thermal fixing device.

2. Description of the Related Art

Conventional image forming devices such as facsimile machines and copy machines are known for forming toner images onto a recording sheet. The image forming devices include a transfer unit and a thermal fixing device. The transfer unit transfers the toner image onto a recording sheet and the thermal fixing device fixes the toner onto the recording sheet.

The thermal fixing device includes a heat roller and a pressure roller. The thermal fixing device fixes toner onto sheets using the operation of this pair of rollers. That is, the heat roller includes an internal heater and serves to melt the toner onto the recording sheet. The pressure roller sandwiches the recording sheet between itself and the heat roller and presses the toner onto the recording sheet. The heat roller and the pressure roller transport the recording sheet from upstream to downstream by rotating in mutually opposite directions while the recording sheet is sandwiched therebetween.

Often toner is poorly fixed on recording sheets because the thermal fixing device is used to fix toner onto recording sheets before heat from the heat roller has properly accumulated in the pressure roller. This is particularly a problem when the image forming device is located in a cold room, because the recording sheets supplied to the image forming device will also be cold and draw a great deal of heat from the pressure roller.

To overcome this problem, Japanese Patent-Application Publication No. 5-127565 discloses a thermal fixing device that performs not only an initial warm up, but also a high-temperature warm up for a fixed time after the initial warm up. During the high-temperature warm up, the fixing roller is heated up to a higher temperature than the normal fixing temperature used to fix toner onto recording sheets, so that the thermal fixing device properly fixes toner to sheets.

Japanese Patent-Application Publication No. 2-211472 discloses a thermal fixing device wherein if the heat roller is heated up to a predetermined temperature within a fixed time, then printing is performed immediately. On the other hand, if it takes longer than the predetermined time, printing is delayed for a fixed duration of time wherein the radiant heat of the heat roller warms up the surrounding components so that printing can be performed without influence from the ambient temperature.

Japanese Patent-Application Publication No. 3163483 discloses a thermal fixing device that determines whether the surface temperature of a fixing roller reaches a set temperature within a fixed time period from when power is turned ON. When it takes longer than a fixed duration of time, then this means that the surrounding environment is cool or applied voltage is insufficient. In this case, the fixing roller is heated until it reaches a higher temperature than used when the surrounding environment is warm or applied voltage is sufficient.

SUMMARY OF THE INVENTION

However, in the above-described publications, the fixing rollers are heated up to a higher temperature than normal, based on fixed time periods. As a result, heating operations may be performed for longer than needed, which would result in wasted energy.

It is an objective of the present invention to provide a thermal fixing device capable of preventing the problem of defective toner fixation without wasting energy and also an image forming device that includes such a thermal fixing device.

In order to achieve the above-described objectives, a thermal fixing device according to the present invention is for fixing toner images onto recording sheets and includes a heat member, a pressing member, a temperature sensor, a clock, and a control unit. The temperature sensor detects temperature of the heat member. The clock measures a start-up time from when the heat member starts to heat up to until the temperature sensor detects that the heat member has reached a predetermined reference temperature. The control unit performs a toner fixing control and a high-temperature heat-up control. During the toner fixing control, the control unit controls the heat member to heat up to a fixing temperature required to melt toner on a recording sheet disposed between the heat member and the pressing member. During the high-temperature heat-up control, the control unit controls the heat member to heat up to a high-temperature fixing temperature that is higher than the fixing temperature. The control unit sets length of the high-temperature heat-up control in accordance with length of the start-up time measured by the clock.

BRIEF DESCRIPTION OF THE DRAWINGS

The above and other objects, features and advantages of the invention will become more apparent from reading the following description of the embodiment taken in connection with the accompanying drawings in which:

FIG. 6 is a flowchart representing a high temperature heating time β setting routine;

FIG. 7 is a flowchart representing processes performed after each toner fixing operation is completed;

FIG. 8 is a graph representing changes in the outer peripheral temperature of the heater roller during initial warm up and high-temperature heating control.

DETAILED DESCRIPTION OF THE EMBODIMENT

Next, a facsimile machine 2 according to an embodiment of the present invention will be described. The facsimile machine 2 includes a facsimile function, a printer function, and a copy function. The facsimile function enables the facsimile machine 2 to function as a facsimile machine to retrieve images from documents in the form of image data and transmit the image data over a telephone line as facsimile data (referred to alternately as fax data hereinafter) to a remote facsimile machine, and also to receive facsimile data that was transmitted over a telephone line from a remote facsimile machine and form images on recording sheets based on the received facsimile data.

The printer function enables the facsimile machine 2 to function as a printer to receive code data (referred to alternately as PC data hereinafter) that was transmitted over a printer cable from a personal computer or a word processor, for example, and to form images that correspond to the PC data on recording sheets.

The copy function enables the facsimile machine 2 to function as a copy machine to retrieve images from documents as image data and form copies of the documents on recording sheets based on the image data.

Figure 1:
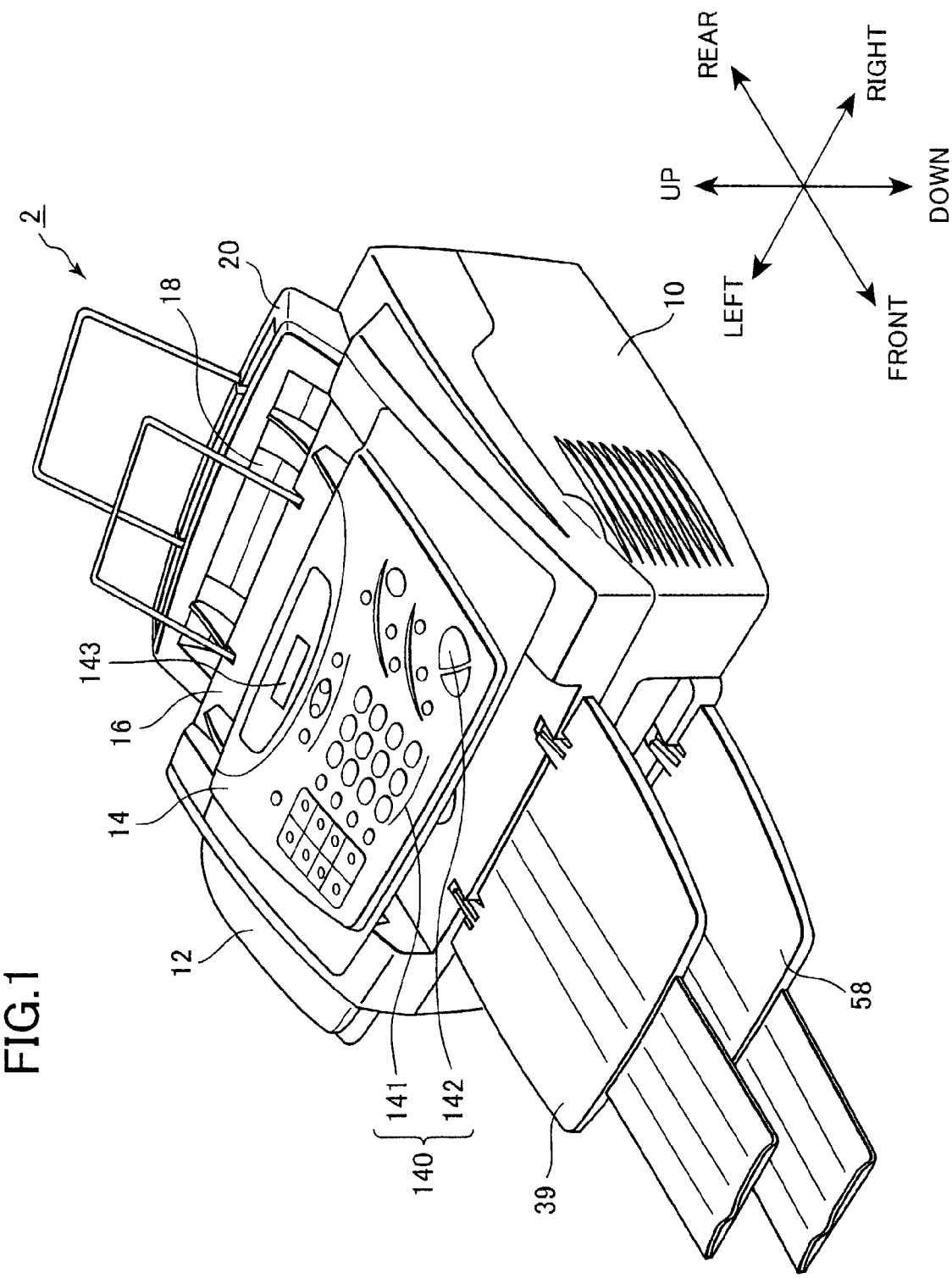
FIG. 1 is a perspective view showing a facsimile machine according to an embodiment of the present invention.

The external configuration of the facsimile machine 2 will be described with reference to FIG. 1. As shown in FIG. 1, the facsimile machine 2 includes a main casing 10, an operation panel 14, a handset 12, and trays 16, 18, 20, 39, and 58.

The document-sheet-supply tray 16, the recording-sheet-supply tray 18, and the third sheet-supply tray 20 are provided in this order, from frontmost to rearmost, at the upper rear of the main casing 10. The recording-sheet-supply tray 18 is provided at a position higher than the third sheet-supply tray 20, and the document-sheet-supply tray 16 is provided at a position higher than the recording-sheet-supply tray 18.

The operation panel 14 is provided at the upper front of the main casing 10. The operation panel 14 includes a variety of keys 140 and a liquid crystal display (LCD) 143. The keys 140 include numeric keys 141 used to input the FAX number of a remote facsimile machine and a start button 142. The LCD 143 is for displaying information relating to a variety of functions of the facsimile machine 2. The handset 12 is attached to the main casing 10 at the left of the operation panel 14. The document-discharge tray 39 and the recording-sheet-discharge tray 58 are provided at the front end of the main casing 10.

Figure 2:
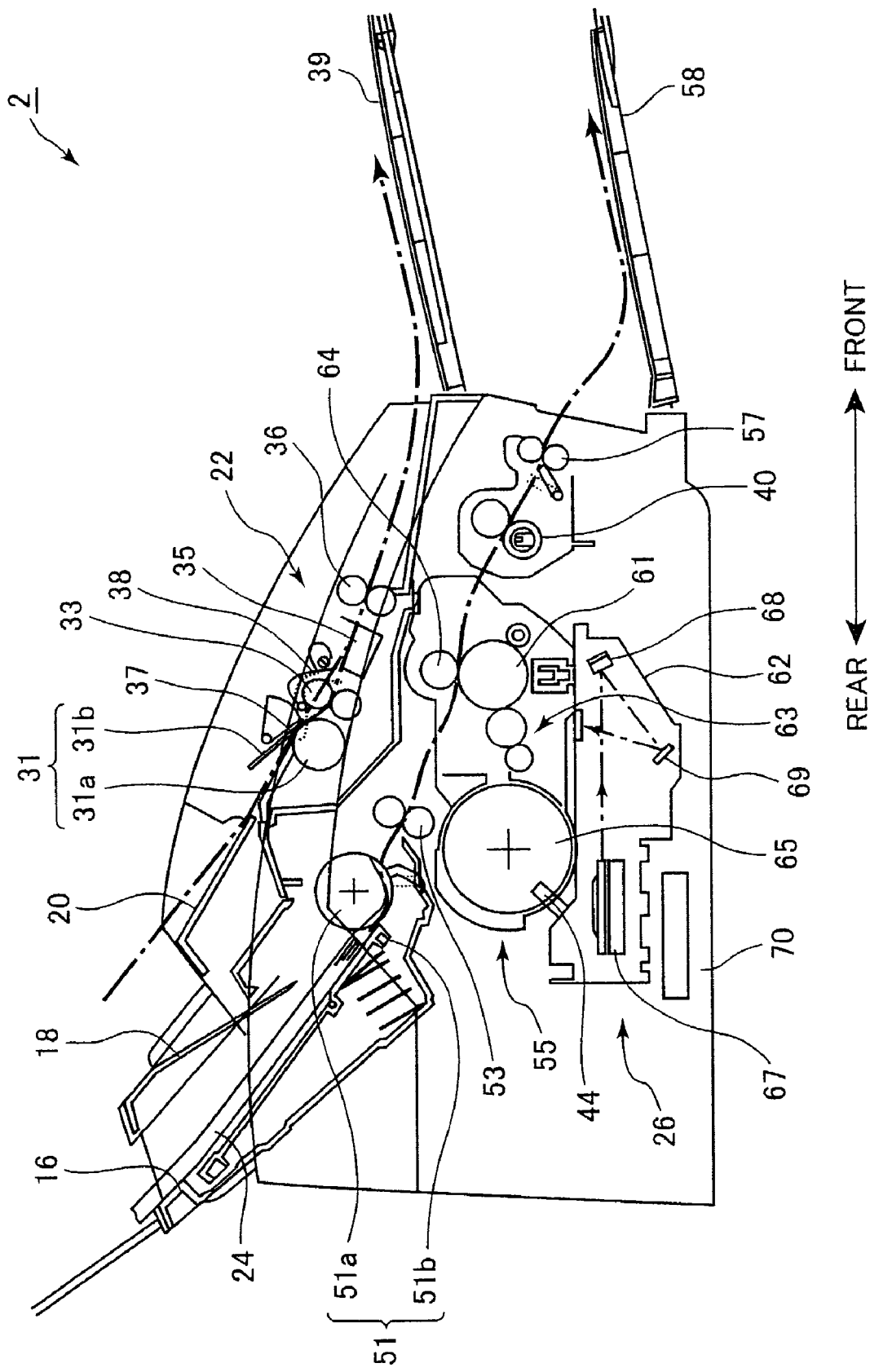
FIG. 2 is a cross-sectional view showing the facsimile machine of FIG. 1.

Next, the internal configuration of the facsimile machine 2 will be described while referring to FIG. 2. The main casing 10 houses a scanner portion 22, a recording portion 26, and a control portion 70.

The scanner portion 22 is for retrieving images from documents stacked on the third sheet-supply tray 20. The scanner portion 22 includes a document-supply mechanism 31, transport rollers 33, an image retrieval unit 35, sheet-discharge rollers 36, a document front sensor 37, a document end sensor 38, and the document-discharge tray 39. The document-supply mechanism 31 includes a sheet-supply roller 31a and a separation pad 31b for drawing in one sheet at a time of documents stacked on the document-sheet-supply tray 16. The transport rollers 33 transport documents toward the image retrieval unit 35. The document front sensor 37 is for detecting the front edge of documents transported to the image retrieval unit 35 and the document end sensor 38 is for detecting the rear edge of documents transported out from the image retrieval unit 35. The retrieval unit 35 retrieves image data corresponding to the image on each document based on the detection of the document front sensor 37 and the document end sensor 38. After the image retrieval unit 35 retrieves image data of a document, the sheet-discharge rollers 36 transport the document to the document-discharge tray 39.

The recording portion 26 is configured in the manner of a laser printer and forms toner images on recording sheets 24 housed in the document-sheet-supply tray 16, in accordance with commands from the control portion 70. The recording portion 26 includes a sheet-supply mechanism 51, transport rollers 53, an image forming unit 55, a fixing unit 40, sheet-discharge rollers 57, and a recording-sheet-discharge tray 58. The sheet-supply mechanism 51 includes a sheet-supply roller 51a and a separation pad 51b for drawing in recording sheets 24 stacked on the recording-sheet-supply tray 18 one sheet at a time. The transport rollers 53 transport the recording sheets 24 to the image forming unit 55.

The image forming unit 55 forms images on the recording sheets 24 using toner, and includes a photosensitive drum 61, a laser light scan unit 62, a developing unit 63, a transfer roller 64, and a toner tank 65. The toner tank 65 stores toner. The laser light scan unit 62 irradiates the surface of the photosensitive drum 61 with laser light to form a latent electrostatic image on the surface of the photosensitive drum 61. The developing unit 63 supplies toner from the toner tank 65 to the surface of the photosensitive drum 61 to develop the latent electrostatic image on the surface of the photosensitive drum 61 into a visible toner image. The transfer roller 64 transfers the visible toner image from the photosensitive drum 61 onto a recording sheet transported by the transport rollers 53. The laser light scan unit 62 includes a laser light emitting portion 67, a laser reflecting lens 68, and a reflecting mirror 69. The reflecting mirror 69 is for guiding laser light reflected by the lens 68 to the photosensitive drum 61.

Figure 3:
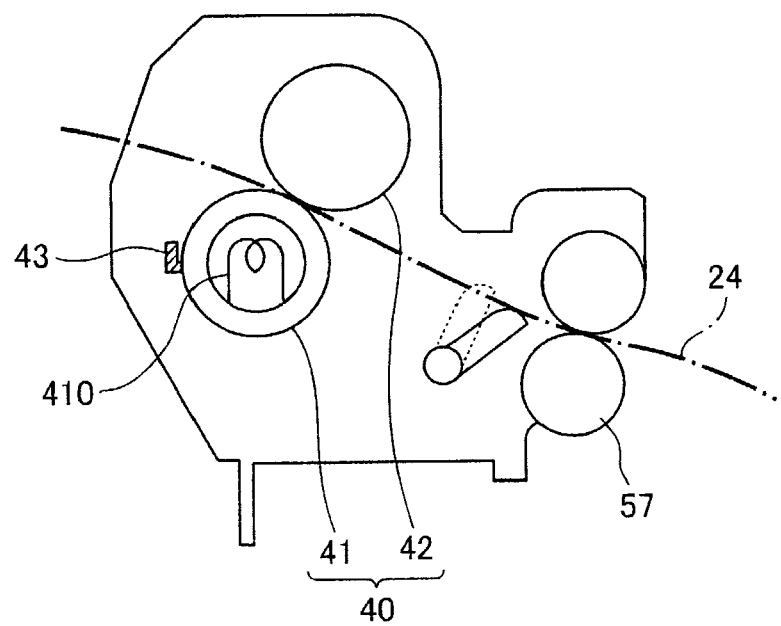
FIG. 3 is a magnified view showing the portion of the facsimile machine where a thermal fixing device is located.

The fixing unit 40 is disposed downstream from the image forming unit 55 with respect to direction of sheet transport. The fixing unit 40 fixes images onto recording sheets 24 that are transported from the image forming unit 55. The sheet-discharge rollers 57 transport the recording sheets 24 onto the recording-sheet-discharge tray 58. As shown in FIG. 3, the fixing unit 40 includes a heat roller 41 and a pressure roller 42. The heat roller 41 includes an internal heater, 410 for melting toner that has been transferred to recording sheets 24. The pressure roller 42 is disposed in parallel with the heat roller 41. Recording sheets 24 from the image forming unit 55 enter between the heat roller 41 and the pressure roller 42 and are transported the heat roller 41 and the pressure roller 42 toward the sheet-discharge rollers 57. While recording sheets are sandwiched between the heat roller 41 and the pressure roller 42, the pressure roller 42 presses the transferred toner against the recording sheets 24.

Figure 4:
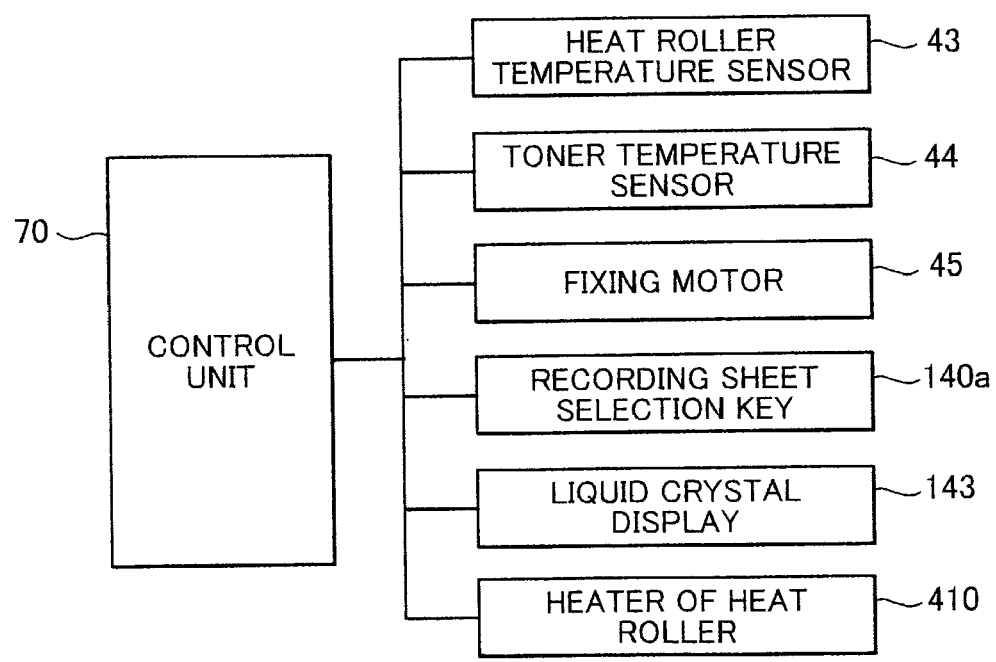
FIG. 4 is a block diagram showing electrical components of the facsimile machine.

As shown in FIG. 4, the control portion 70 is connected to various electrical components of the fixing unit 40, including a roller temperature sensor 43, a toner temperature sensor 44, a fixing motor 45, a recording sheet selection key 140a, a liquid crystal display (LCD) 143, and a heater 410. The roller temperature sensor 43 is for detecting the temperature at the outer peripheral surface of the heat roller 41. The toner temperature sensor 44 is for detecting temperature in the toner tank. The fixing motor 45 is for rotating the heat roller 41, the transfer roller 64, and other components. The recording sheet selection key 140a and the LCD 143 are disposed on the operation panel 14. The heater 410 is disposed inside the heat roller 41. The roller temperature sensor 43, the toner temperature sensor 44, the fixing motor 45, the recording sheet selection key 140a, the LCD 143, and the heater 410 are controlled by the control portion 70 in a manner to be described next.

Figure 5:
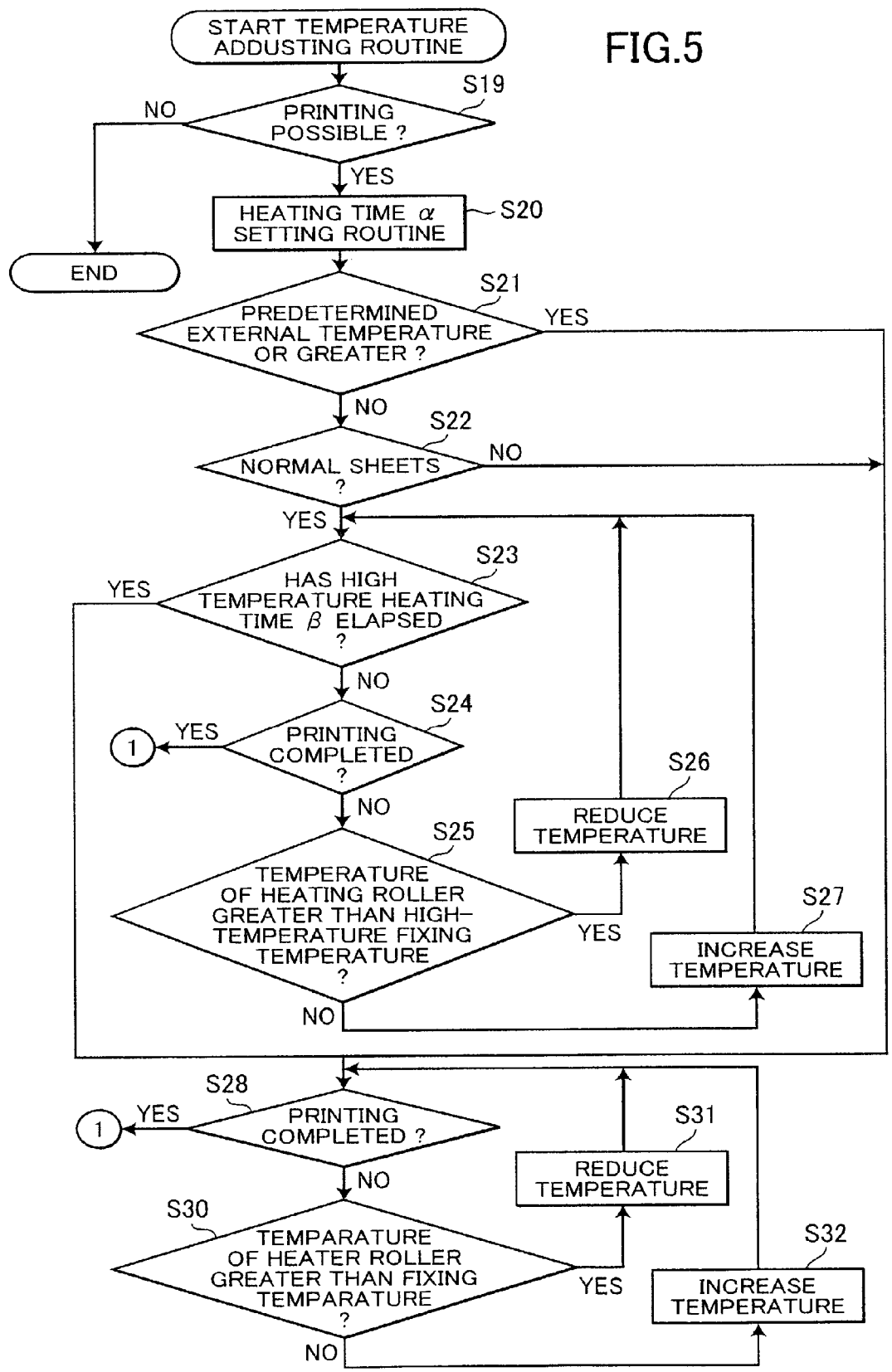
FIG. 5 is a flowchart representing a temperature adjusting routine for adjusting temperature of the thermal fixing device.

Next, a temperature adjusting routine will be described with reference to the flowchart in FIG. 5. The control portion 70 begins the temperature adjusting routine when it receives a "print command" while the facsimile machine 2 is in its sleep mode. Examples of "print commands" include detection that the start button 142 was pressed, start of a copy operation, a command to print out facsimile data when it is detected that facsimile data was received from a remote facsimile machine, and a command to print out data received from a personal computer. As will be described later, the facsimile machine 2 enters the sleep mode when not used for a predetermined duration of time. In the sleep mode, power supply to the heater 410 is stopped in order to conserve electricity. It should be noted that the temperature adjusting routine of FIG. 5 is not executed when the facsimile machine 2 is in its standby mode at the time when a print command is received. In the standby mode, power supply to the heater 410 is maintained so that the fixing unit 40 can be promptly operated at the fixing temperature so that normal printing operations can be promptly performed.

When the temperature adjusting routine is started, then in S19 it is judged whether or not printing is possible. Whether printing is possible is determined based on such conditions as whether any sheets are stacked on the document-supply tray 16 or the recording-sheet-supply tray 18 and whether there are any paper jams. If printing is not possible (S19: NO), then the temperature adjusting routine is ended. On the other hand, if printing is possible (S19:YES), then a heating time setting routine is started in S20.

The heating time setting routine of S20 is represented by the flowchart of FIG. 6. First, the fixing temperature of the heat roller 41 is set in S100 in accordance with the type of the recording sheet presently being used. To set the fixing temperature, first the control portion 70 reads the setting of the recording sheet selection key 140 to determine whether the recording sheets 24 presently being used are, for example, normal sheets, thick sheets, thin sheets, or overhead projector sheets. Then, the control portion 70 refers to a predetermined table to set the fixing temperature of the heat roller 41 based on the detected recording sheet type. In the present embodiment, the control portion 70 sets the fixing temperature to 195° C. when the recording sheets 24 are normal sheets, to 220° C. when the recording sheets 24 are thick sheets, and to 170° C. when the recording sheets 24 are overhead projector sheets or thin sheets. It should be noted that the recording sheet selection key 140 is normally set to normal sheets as the type of recording sheet. Therefore, in cases when another type of sheet, such as thick sheets, is used in the facsimile machine 2, the subsequent processes will performed for normal sheets anyway unless the user sets the recording sheet selection key 140. Alternatively, the facsimile machine 2 can be designed to automatically judge the type of recording sheet.

Once the settings in S100 are completed, then power is supplied to the heater 410 of the heat roller 41 in S110 to begin an initial warming up. Next, a start up time $\alpha$ is measured in S120. The start up time $\alpha$ is the time required for the heat roller 41 to heat up to a standby temperature. The standby temperature is the temperature at which the heat roller 41 is maintained during the standby mode and which is lower than the fixing temperature. For example, in the present embodiment, the fixing temperature is 195° C. and the standby temperature is 165° C. To measure the start up time $\alpha$, time is counted from when power supply to the heater 410 is started in S110, while detecting the temperature at the outer periphery of the heat roller 41 using the roller temperature sensor 43.

While the start up time $\alpha$ is being measured in S120, in S140 it is judged whether or not the temperature at the outer periphery of the heat roller 41 has reached the standby temperature. If the temperature at the outer periphery of the heat roller 41 has not reached the standby temperature (S140:NO), then the time measurement and the temperature detection of S120 is continued. Once the temperature at the outer periphery of the heat roller 41 reaches the standby temperature (S140:YES), then the start-up time $\alpha$ is set in S160. At this time, the LCD 143 is controlled to indicate that preparations for a copy operation are completed.

Then in S170, a high temperature heating time $\beta$ is set to a function of the start up time $\alpha$ that was set in S160. In the present embodiment, the function for determining the high temperature heating time $\beta$ is multiplying the start up time $\alpha$ by an integral multiple X. More specifically, the integral multiple X equals six, so the high-temperature heating time $\beta$ is set to six times the start up time $\alpha$ ($\beta=6\alpha$). Then, in S180 supply of recording sheets 24 is started. Then, the program returns to S21 in FIG. 5.

After the start-up time $\alpha$ and the high-temperature heating time $\beta$ are set and sheet supply started, the time from when sheet supply is started until a recording sheet 24 reaches the fixing unit 40 is used to further heat up the heater 410. In S21, it is judged whether or not the ambient temperature detected by the toner temperature sensor 44 is equal to or greater than a temperature T1° C. According to the present embodiment, the temperature T1° C. is 21° C. If not (S21: NO), then in S22 it is judged whether or not the recording sheets 24 are normal sheets.

If the recording sheets 24 are normal sheets (S22:YES) then the routine begins a high-temperature heating control, wherein the heat roller 41 is temporarily heated up to a high-temperature fixing temperature, which is higher than the fixing temperature for normal sheets, to insure that toner is properly fixed onto recording sheets even when the facsimile machine 2 is located in a cold room. In the high-temperature heating control, first it is judged in S23 whether or not the high-temperature heating time $\beta$ determined in S170 has elapsed. If the high-temperature heating time $\beta$ has not elapsed (S23:NO), then in S24 it is judged whether or not printing has been completed. If so (S24: YES), then in S25 it is judged whether or not the temperature at the peripheral surface of the heat roller 41 is higher than a high-temperature fixing temperature. If so (S25:YES), then the temperature of the heater 410 is decreased in S26. If the peripheral surface of the heat roller 41 is cooler than the high-temperature fixing temperature (S25:NO), then the temperature of the heater 410 is raised in S27. After the temperature of the heater 410 is decreased (S26) or increased (S27), then the high-temperature heating control is continued by repeating S23, S24, and S25.

The result of the high-temperature heating control is shown in FIG. 8. That is, after sheet supply starts, the temperature at the outer peripheral surface of the heat roller 41 is raised and maintained in the vicinity of the high-temperature setting fixing temperature until the high-temperature heating time $\beta$ elapses. Therefore, even when the recording sheets 24 absorb heat from the heat roller 41, such as at times indicated by A in FIG. 8, the temperature of the heat roller 41 remains above the fixing temperature so that toner can be reliably fixed to recording sheets 24.

Once the high-temperature heating time $\beta$ elapses (S23: YES), the fixing unit 40 will have accumulated sufficient heat so that, as shown in FIG. 8, the outer peripheral surface of the heat roller 41 will be sufficiently hot to properly fix toner onto recording sheets 24 even if the recording sheets 24 are relatively cool. Therefore, after the high-temperature heating time $\beta$ elapses (S23:YES), the temperature of the fixing unit 40 is adjusted to the fixing temperature set for the present recording sheet. First, it is judged in S28 whether or not printing was completed. If not (S28:NO), it is judged in S30 whether the outer peripheral surface of the heat roller 41 is hotter than the normal fixing temperature. If so (S30: YES), then the temperature is decreased in S31. If not (S30:NO), then the temperature is raised in S32. After the temperature of the heat roller 41 is adjusted in S31 or S32, then the processes of S28 to S30 are repeated until printing is completed.

If the toner temperature sensor 44 detects a relatively warm ambient temperature, that is, an ambient temperature that is equal to or greater than the temperature T1° C. (S21:YES), or if the recording sheets 24 are a type of sheet other than normal sheets (S22:NO) then the high-temperature heating control of S23 to S27 is bypassed and toner fixation is performed in S28 to S32 at the fixing temperature set for the present recording sheet. More specifically, when other than normal recording sheets 24 are used (S22:NO), the processes in S28 to S32 are performed with a fixing temperature of 220° C. when the recording sheets 24 are thick sheets and at a fixing temperature of 170° C. when the recording sheets 24 are overhead projector sheets.

Once printing is completed (S24 or S28:YES), then as shown in FIG. 7 the facsimile machine 2 enters a standby mode in S40. The standby mode lasts for a five minute duration of time as determined in S42. During the standby mode, the fixing unit 40 operates to maintain the heat roller 41 at a temperature of 165° C. Once the duration of time for the standby mode ends (S42:YES), then the facsimile machine 2 enters the sleep mode in S44 and this routine ends. It should be noted that if the start button 142 is pressed while the facsimile machine 2 is in the standby mode, that is, before the five minutes are up, then the routine of FIG. 5 ends and normal printing operations are performed.

The temperature adjusting routine of FIG. 5 produces the following effects. The high-temperature heating control of S23 to S27 for heating the heat roller 41 up to the high-temperature fixing temperature is performed for a duration of time, that is, the high-temperature heating time β, that is lengthened or shortened depending on how long it takes the heat roller 41 to heat up to the standby temperature, that is, depending on the length of the start up time α measured in S120. That is, if a long start up time α is required for the heat roller 41 to heat up to the standby temperature, then the high-temperature heating control of S23 to S27 is performed for a long time. On the other hand, if only a short start up time α is required for the heat roller 41 to heat up to the standby temperature, then the high-temperature heating control of S23 to S27 is performed for a short time. Therefore, when the facsimile machine 2 is located in a cool area so the pressure roller 42 does not efficiently accumulate heat and so cannot warm up properly, the high-temperature heating control is performed for a longer time so the pressure roller 42 will have a longer period of time to accumulate heat. On the other hand, when the surrounding temperature is high so the pressure roller 42 efficiently accumulates heat, the high-temperature heating control is performed for a shorter time. For this reason, the pressure roller 42 will accumulate sufficient heat needed to melt toner, regardless of the ambient temperature. Moreover, the process for heating up the pressure roller 42 will not be performed longer than necessary, so energy is not wasted. Accordingly, the fixing unit 40 of the present embodiment reliably prevents defective toner fixation and prevents wasteful consumption of energy.

Also, the fixing unit 40 does not perform the high-temperature heating control when the toner temperature sensor 44 detects an ambient temperature that is equal to or greater than a predetermined temperature T1° C. That is, it can be assumed that if the ambient temperature is warm, then recording sheets 24 will be sufficiently warm so that the recording sheets 24 will absorb only a small amount of heat from the heat roller 41. As a result, the heat roller 41 will properly fix toner onto the recording sheets 24 without need for the high-temperature heating control of S23 to S27. Therefore, the high-temperature heating control of S23 to S27 is not performed. Accordingly, by using the fixing unit 40, wasteful consumption of power can be prevented because the high-temperature heating control is not performed when the facsimile machine 2 is located in a warm area.

The fixing temperature is already set higher for thick sheets than for normal sheets, because thick sheets in general can be expected to absorb more heat than normal sheets. The fixing temperature is set lower for sheets that can be easily melted, such as overhead projection sheets, and also for thin sheets because the thin sheets can be heated up too high, which results in warping of the sheets and problems other than defective toner fixation. Therefore, the control portion 70 only performs the high-temperature heating control when the present recording sheet 24 is a normal sheet as judged in S22. When it is judged that that some other type of recording sheet besides a normal sheet is being used, then the fixing temperature of the heat roller 41 is set to the fixing temperature established for the presently used recording sheet, without executing the high-temperature heating control. Since a relatively high fixing temperature is already set for thick sheets, performing the high-temperature heating control would be pointless and waste energy when the recording sheet is a thick sheet. Also, when thin sheets are used, heat warping of the sheets can be prevented by not performing the high-temperature heating control when thin sheets are being used.

While the invention has been described in detail with reference to a specific embodiment thereof, it would be apparent to those skilled in the art that various changes and modifications may be made therein without departing from the spirit of the invention, the scope of which is defined by the attached claims.

For example, the embodiment describes multiplying the start up time α by an integral multiple X as an example of the function for determining the high temperature heating time β. However, any function wherein the high temperature heating time β increases with increase in the start up time α can be used instead. Accordingly, another possible example of the function for determining the high temperature heating time β is the square of the start up time α ($\beta = \alpha^2$).

Also, the embodiment describes using the standby temperature as a reference temperature for measuring the start-up time. However, the fixing temperature or the high-temperature fixing temperature could be used as the reference temperature for measuring the start-up time instead. Also, the reference temperature could be varied to a temperature appropriate for the environment in which the facsimile machine 2 is located.

Also, the embodiment describes using the toner temperature sensor 44 to measure the ambient temperature. However, a separate sensor could be provided exclusively for measuring the ambient temperature, although using the toner temperature sensor 44 also for this purpose reduces the number of required components for the facsimile machine 2.

Further, the embodiment describes the toner temperature sensor 44 detecting a temperature T1° C. of 21° C. or greater in S21. However, the temperature T1° C. could be set to a higher temperature when the facsimile machine 2 is to be used in cold climates and to a lower temperature when the facsimile machine 2 is to be used in warm climates.

Further, the embodiment describes the heat roller 41 and the pressure roller 42 for heating and pressing sheets to fix toner onto the sheets. However, the members for heating and pressing sheets to fix toner onto the sheets need not have a roller shape, but could be any other suitable configuration could be used instead.

The embodiment describes setting the fixing temperature to the high-temperature fixing temperature only when normal sheets are being used. However, the fixing temperature could be set to the high-temperature fixing temperature when other sheets, such as thick sheets, thin sheets, and overhead projection sheets, are being used.

The high-temperature fixing temperature set for normal sheets can be set to the same fixing temperature used for thick sheets. With this configuration, the number of temperature types that the device needs to be controlled to can be reduced, so that temperature control is facilitated.

Also, the embodiment describes setting the high temperature heating time β in S170 as soon as the start up time α was determined. However, the high temperature heating time β could be set directly before starting the high-temperature heating control.

What is claimed is:

1. A thermal fixing device for fixing toner images onto recording sheets, the thermal fixing device comprising:
    a heat member;
    a pressing member disposed in pressing contact with the heat member;
    a temperature sensor that detects temperature of the heat member;
    a sheet judgment unit that judges a type of recording sheet being used;
    a fixing temperature setting unit that sets a fixing temperature required to melt toner on a recording sheet disposed between the heat member and the pressing member; and
    a control unit that performs a high-temperature heat-up control and a toner fixing control after the high-temperature heat-up control,
    wherein during the high-temperature heat-up control the control unit controls the heat member to heat up to a high fixing temperature that is higher than the fixing temperature set by the fixing temperature setting unit,
    wherein during the toner fixing control the control unit controls the heat member to the fixing temperature set by the fixing temperature setting unit, and
    wherein the control unit bypasses the high-temperature heat-up control to heat the heat member directly to the fixing temperature without going through a temperature that is higher than the fixing temperature to maintain the heat member to the fixing temperature when the sheet judgment unit judges a predetermined type of recording sheet.

2. The thermal fixing device as claimed in claim 1, further comprising a clock that measures a start-up time from when the heat member starts to heat up to until the temperature sensor detects that the heat member has reached a predetermined reference temperature,
    wherein the control unit sets length of the high-temperature heat-up control in accordance with length of the start-up time measured by the clock.

3. The thermal fixing device as claimed in claim 1, wherein the fixing temperature setting unit sets the fixing temperature to one of sheet-type dependent temperatures depending on the type of recording sheet being used.

4. The thermal fixing device as claimed in claim 3, wherein when the judgment unit judges that the recording sheet is a normal sheet, the control unit performs the high-temperature heat-up control.

5. A thermal fixing device for fixing toner images onto recording sheets, the thermal fixing device comprising:
    a heat member;
    a pressing member disposed in pressing contact with the heat member;
    a temperature sensor that detects a temperature of the heat member;
    a control unit that performs a high-temperature heat-up control and a toner fixing control after the high-temperature heat-up control, wherein during the toner fixing control the control unit controls the heat member to heat up to a fixing temperature required to melt toner on a recording sheet disposed between the heat member and the pressing member and during the high-temperature heat-up control the control unit controls the heat member to heat up to a high-temperature fixing temperature that is higher than the fixing temperature; and
    an atmospheric temperature sensor that detects atmospheric temperature, the control unit bypasses the high-temperature heat-up control to heat the heat member directly to the fixing temperature without going through a temperature that is higher than the fixing temperature and to maintain the heat member to the fixing temperature when the atmospheric temperature sensor detects a temperature that is equal to or greater than a predetermined atmospheric temperature.

6. The thermal fixing device as claimed in claim 5, further comprising a clock that measures a start-up time from when the heat member starts to heat up to until the temperature sensor detects that the heat member has reached a predetermined reference temperature,
    wherein the control unit sets the length of the high-temperature heat-up control in accordance with length of the start-up time measured by the clock.

7. The thermal fixing device as claimed in claim 5, further comprising a sheet judgment unit that judges a type of recording sheet being used,
    wherein the control unit performs, depending on the type of recording sheet judged by the sheet judgment unit, the high-temperature heat-up control.

8. The thermal fixing device as claimed in claim 7, further comprising a fixing temperature setting unit that sets the fixing temperature to one of sheet-type dependent temperatures depending on the type of recording sheet being used.

9. The thermal fixing device as claimed in claim 8, wherein when the judgment unit judges that the recording sheet is a normal sheet, the control unit performs that high-temperature heat-up control.

10. The thermal fixing device as claimed in claim 6, wherein the control unit enters a temporary stand-by mode after completion of at least one of the toner fixing control and the high-temperature heat-up control, the control unit, while in the stand-by mode, controlling the heat member to a stand-by temperature that is lower than the fixing temperature, the clock measuring the start-up time using the stand-by temperature as the reference temperature.

11. The thermal fixing device as claimed in claim 5, wherein the control unit controls the high-temperature heat-up control to continue for a function of the start-up time.

12. The thermal fixing device as claimed in claim 5, wherein during the high-temperature heat-up control, the control unit controls the heat member and the pressing member to fix toner onto an interposed recording sheet at the high-temperature fixing temperature.

13. The thermal fixing device as claimed in claim 5, further comprising a sheet judgment unit that judges whether the recording sheet is a thick type, a normal type, or a thin type, the control unit setting the fixing temperature to a relatively high temperature when the sheet judgment unit judges that the recording sheet is a thick type, to a medium temperature that is lower than the high temperature when the sheet judgment unit judges that the recording sheet is a normal type, and to a low temperature that is lower than the medium temperature when the sheet judgment unit judges that the recording sheet is a thin type.

14. The thermal fixing device as claimed in claim 6, further comprising a power source that supplies power to the heating member, the clock measuring the start up time starting from when the power source starts supplying power to the heating member.

15. An image-forming device, comprising:
an image forming unit that forms toner images on recording sheets; and
a thermal fixing device for fixing the toner images onto the recording sheets, the thermal fixing device including:
a heat member;
a pressing member disposed in pressing contact with the heat member;
a temperature sensor that detects temperature of the heat member;
a sheet judgment unit that judges a type of recording sheet being used;
a fixing temperature setting unit that sets a fixing temperature required to melt toner on a recording sheet disposed between the heat member and the pressing member; and
a control unit that performs a high-temperature heat-up control and a toner fixing control after the high-temperature heat-up control,
wherein during the high-temperature heat-up control the control unit controls the heat member to heat up to a high fixing temperature that is higher than the fixing temperature set by the fixing temperature setting unit,
wherein during the toner fixing control the control unit controls the heat member to the fixing temperature, and
wherein the control unit bypasses the high-temperature heat-up control to heat the heat member directly to the fixing temperature without going through a temperature that is higher than the fixing temperature and to maintain the heat member to the fixing temperature when the sheet judgment unit judges a predetermined type of a recording sheet.

16. An image-forming device, comprising:
an image forming unit that forms toner images on recording sheets; and
a thermal fixing device for fixing the toner images onto the recording sheets, the thermal fixing device including:
a heat member;
a pressing member disposed in pressing contact with the heat member;
a temperature sensor that detects temperature of the heat member;
a control unit that performs a high-temperature heat-up control and a toner fixing control after the high-temperature heat-up control, wherein during the toner fixing control the control unit controls the heat member to heat up to a fixing temperature required to melt toner on a recording sheet disposed between the heat member and the pressing member and during the high-temperature heat-up control the control unit controls the heat member to heat up to a high-temperature fixing temperature that is higher than the fixing temperature; and
an atmospheric temperature sensor that detects atmospheric temperature, the control unit bypasses the high-temperature heat-up control to heat the heat member directly to the fixing temperature without going through a temperature that is higher than the fixing temperature and to maintain the heat member to the fixing temperature when the atmospheric temperature sensor detects a temperature that is equal to or greater than a predetermined atmospheric temperature.

17. The image forming device as claimed in claim 16, further comprising a sheet-supply unit that supplies the recording sheets to the image forming device, the control unit entering a temporary stand-by mode after a fixing operation is completed using the heat member and the pressing member, the control unit, while in the stand-by mode, controlling the heat member to a stand-by temperature that is lower than the fixing temperature, the clock measuring the start-up time using the stand-by temperature as the reference temperature, the sheet-supply unit supplying sheets once the stand-by temperature is achieved.

18. The thermal fixing device as claimed in claim 2, wherein the control unit enters a temporary stand-by mode after completion of at least one of the toner fixing control and the high-temperature heat-up control, the control unit, while in the stand-by mode, controlling the heat member to a stand-by temperature that is lower than the fixing temperature, the clock measuring the start-up time using the stand-by temperature as the reference temperature.

19. The thermal fixing device as claimed in claim 18, wherein the control unit performs a sleep mode in which power supply to the heat member is stopped, and the stand-by mode in which power supply is maintained so that the heat member is maintained to the stand-by temperature that is lower than the fixing temperature,
wherein the control unit controls the heat member to the high-temperature heat-up control immediate after the control unit stops the sleep mode, and
wherein the control unit controls the heat member to the fixing temperature without performing the high-temperature heat-up control immediate after the control unit stops the stand-by mode.

20. The image-forming device as claimed in claim 15, wherein the thermal fixing device includes a clock that measures a start-up time from when the heat member starts to heat up to until the temperature sensor detects that the heat member has reached a predetermined reference temperature, wherein the control unit sets the length of the high-temperature heat-up control in accordance with length of the start-up time measured by the clock, and
wherein the control unit enters a temporary stand-by mode after completion of at least one of the toner fixing control and the high-temperature heat-up control, the control unit, while in the stand-by mode, controlling the heat member to a stand-by temperature that is lower than the fixing temperature, the clock measuring the start-up time using the stand-by temperature as the reference temperature.

21. The image-forming device as claimed in claim 20, wherein the control unit performs a sleep mode in which power supply to the heat member is stopped, and the stand-by mode in which power supply is maintained so that the heat member is maintained to the stand-by temperature that is lower than the fixing temperature,
wherein the control unit performs the high-temperature heat-up control immediate after the control unit stops the sleep mode, and
wherein the control unit controls the heat member to the fixing temperature without performing the high-temperature heat-up control immediate after the control unit stops the stand-by mode.

* * * * *